(12) United States Patent
Tsuda

(10) Patent No.: US 6,739,364 B2
(45) Date of Patent: May 25, 2004

(54) PNEUMATIC TIRE HAVING TIRE SHOULDER PROVIDED WITH CURVED SURFACE

(75) Inventor: Satoshi Tsuda, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 10 days.

(21) Appl. No.: 09/899,097

(22) Filed: Jul. 6, 2001

(65) Prior Publication Data

US 2002/0017348 A1 Feb. 14, 2002

(30) Foreign Application Priority Data

Jul. 6, 2000 (JP) .......................... 2000-205662
Dec. 12, 2000 (JP) .......................... 2000-377660

(51) Int. Cl.[7] .................... B60C 11/01; B60C 105/00; B60C 107/00
(52) U.S. Cl. .................... 152/209.15; 152/209.16
(58) Field of Search .................... 152/209.15, 209.16

(56) References Cited

U.S. PATENT DOCUMENTS

| | | | | |
|---|---|---|---|---|
| 2,236,903 A | * | 4/1941 | Hale | |
| 2,869,609 A | * | 1/1959 | Billingsley | |
| 4,765,384 A | * | 8/1988 | Rohde | |
| 4,957,149 A | * | 9/1990 | Iuchi | |
| 5,211,780 A | * | 5/1993 | Kabe et al. | |
| 6,371,179 B1 | * | 4/2002 | Tsuda | |

FOREIGN PATENT DOCUMENTS

| | | | |
|---|---|---|---|
| DE | 1 028 448 | | 4/1958 |
| EP | 1010550 | * | 6/2000 |
| GB | 460338 | * | 1/1937 |
| JP | 2-182505 | * | 7/1990 |

* cited by examiner

Primary Examiner—Steven D. Maki
(74) Attorney, Agent, or Firm—Birch, Stewart, Kolasch & Birch, LLP

(57) ABSTRACT

A pneumatic tire which comprises a tread portion with a pair of tread edges, and a tire shoulder extending radially inwardly from one of the tread edges, provided with a curved surface comprising a convex curve, wherein, on a cylindrical surface centered on the tire axis and intersecting the curved surface, the convex curve swells axially outwards and has a curvature, and the curvature gradually diminishes towards the radially inside from the tread edge. It is possible that the tread portion is provided along the tread edges with a circumferentially extending rib and/or a circumferential row of blocks. In case of circumferential rib, the rib is provided with the curved surface comprising a plurality of the convex curves and a plurality of convex curves alternating therewith so that the curved surface is waved in the tire circumferential direction. In case of blocks in a circumferential row, it is preferable that each block is provided with the curved surface comprising at last one convex curve.

7 Claims, 8 Drawing Sheets

PNEUMATIC TIRE HAVING TIRE SHOULDER PROVIDED WITH CURVED SURFACE

The present invention relates to a pneumatic tire, more particularly to a tire shoulder having a specific configuration being capable of improving wandering performance.

In order to prevent wandering of a vehicle during running on rutted roads, countermeasures taken on the pneumatic tires especially for heavy duty vehicles are providing axial cuts or sipes in the tread shoulder to decrease the rigidity, and rounding the tire shoulder with a relatively large radius to decrease the camber thrust.

When the axial sipes are provided, however, the tread rubber is liable to be torn off at the tread edge, and uneven wear is liable to occur along the sipes. These drawbacks are especially remarkable in case of heavy duty radial tires. When the tire shoulder is rounded by a relatively large radius, the ground contacting area decreases, and running performance such as road grip, cornering performance and the like are liable to deteriorate.

It is therefore, an object of the present invention to provide a pneumatic tire, in which wandering performance can be improved, while avoiding the above-mentioned drawbacks, i.e. tread rubber tear-off, uneven wear, ground contacting area decrease and the like.

According to the present invention, a pneumatic tire comprises a tread portion with a pair of tread edges, a tire shoulder extending radially inwardly from one of the tread edges, provided with a curved surface comprising a convex curve, and on a cylindrical surface centered on the tire axis and intersecting said curved surface, said convex curve swelling axially outwards and having a curvature, the curvature gradually diminishing towards the radially inside from the tread edge.

It is possible that the tread portion is provided along the tread edges with a circumferentially extending rib and/or a circumferential row of blocks.

In case of circumferential rib, the rib is provided with the curved surface comprising a plurality of the convex curves and a plurality of convex curves alternating therewith so that the curved surface is waved in the tire circumferential direction.

In case of blocks in a circumferential row, it is preferable that each block is provided with the curved surface comprising at last one convex curve.

Taking a heavy duty radial tire as an example, embodiments of the present invention will now be described in detail in conjunction with the accompanying drawings.

Figure 1:
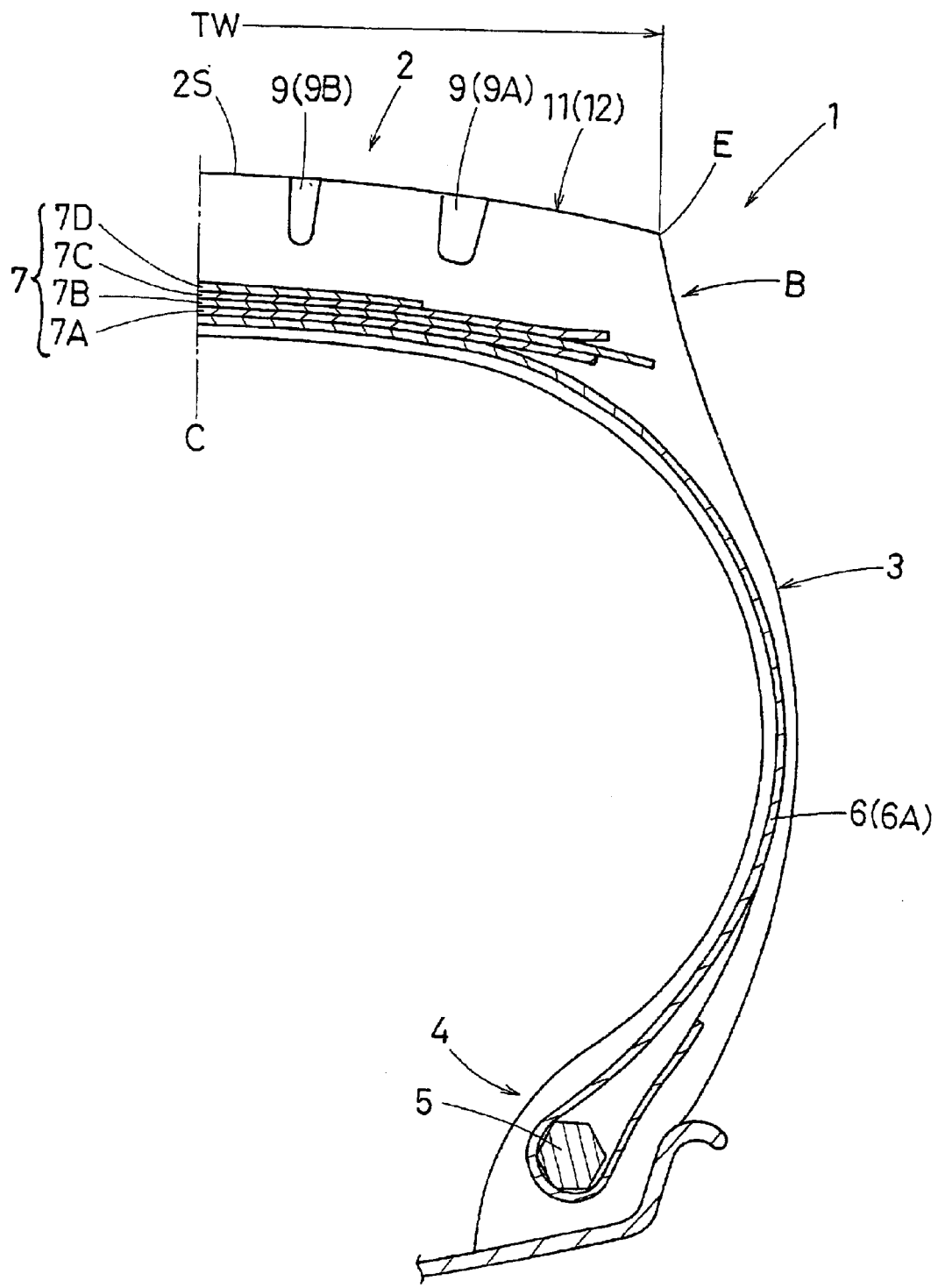
FIG. 1 is a cross sectional view of a pneumatic tire according to the present invention.

In the drawings, pneumatic tire 1 according to the present invention comprises a tread portion 2, a pair of sidewall portions 3, a pair of bead portions 4, a carcass 6 extending between the bead portions 4, and a belt 7 disposed radially outside the carcass 6 in the tread portion 2.

The carcass 6 comprises at least one ply 6A of cords arranged radially at an angle of from 70 to 90 degrees with respect to the tire equator C and extending between the bead portions 4 through the tread portion 2 and sidewall portions 3 and turned up around a bead core 5 in each bead portion 4 from the axially inside to the outside of the tire. For the carcass cords, steel cords are used in this example, but organic fiber cords such as nylon, rayon, polyester, aromatic polyamide and the like may be used according to the category, use and the like.

The belt 7 comprises at least two cross plies. In this example, the belt is composed of a radially innermost ply 7A of parallel steel cords laid at an angle of from 50 to 70 degrees with respect to the tire equator C, and radially outer plies 7B, 7C and 7D each made of parallel steel cords laid at an angle of not more than 30 degrees with respect to the tire equator C. Aside from steel cords, organic cords, e.g. nylon, rayon, nylon, aromatic polyamide and the like may be used. The number of the belt plies mat be changed according to the tire category, use and the like.

Here, the ground contacting width TW of the tire is defined as the maximum width between the tread edges E, that is, the width between the axial outermost points of the edges E of the ground contacting region under such a condition that the tire is mounted on its standard rim and inflated to its standard pressure, and then loaded with a standard load. The standard rim is the "standard rim" specified in JATMA, the "Measuring Rim" in ETRTO, the "Design Rim" in T&RA or the like. The standard pressure is the "maximum air pressure" in JATMA, the "Inflation Pressure" in ETRTO, the maximum pressure given in the "Tire Load Limits at Various Cold Inflation Pressures" table in T&RA or the like. In case of passenger car tires, however, 180 kPa is used as the standard pressure. The standard load is the "maximum load capacity" in JATMA, the "Load Capacity" in ETRTO, the maximum value given in the above-mentioned table in T&RA or the like.

Figure 2:
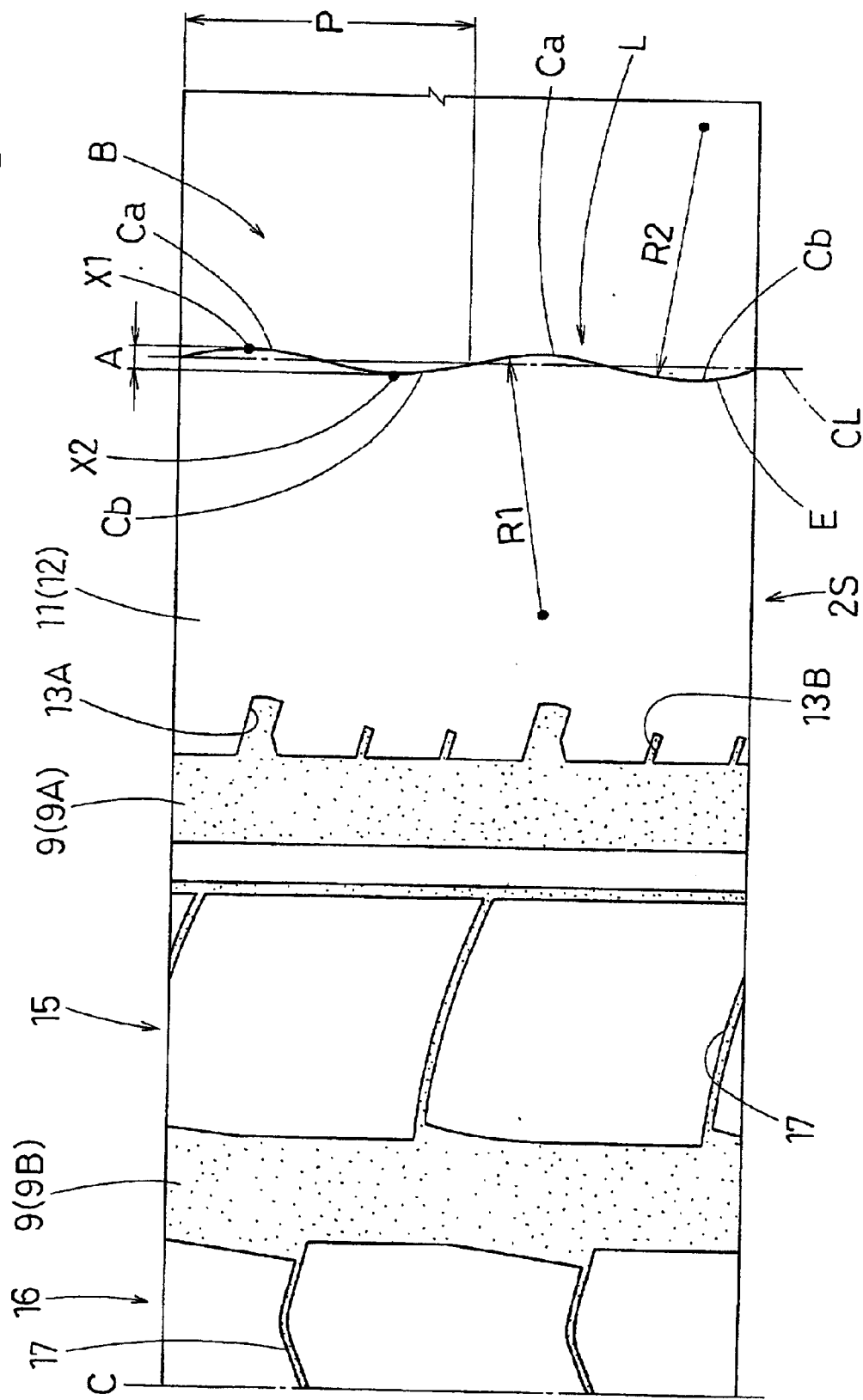
FIG. 2 is a partial developed plan view thereof.

FIG. 2 shows an embodiment of the present invention, wherein a circumferentially continuous rib 12 is formed along each of the tread edges E, and the axially outer surface of the rib 12 is provided with a curved surface Ba having a gradually diminishing curvature.

The tread portion 2 is provided with a plurality of longitudinal main grooves 9 extending continuously in the tire circumferential direction. Each of the longitudinal main grooves 9 may be formed in a straight shape or a zigzag shape. The longitudinal main groove 9 has a groove width of not less than 2.0%, preferably not less than 2.5% of the ground contacting width TW, and a groove depth of from 5 to 12% of the ground contacting width TW. In case of heavy duty tire, it is preferable that the width is at least 5 mm.

In FIG. 2, the longitudinal main grooves 9 are substantially straight, and they are an axially inner longitudinal main groove 9B disposed on each side of the tire equator C and an axially outer longitudinal main groove 9A disposed axially outside thereof.

The above-mentioned circumferentially continuous rib 12 is formed between the axially outer longitudinal main groove 9A and the tread edge E.

As shown in FIG. 2, the axially inner edge of the rib 12 may be provided with short notches 13A and 13B extending axially outwardly from the axially outer longitudinal main groove 9A. But, the axially outer edge or the tread edge is not provided with any notches. Thus, the tread edge E is continuous in the circumferential direction of the tire. Further, no sipe is provided in the vicinity of the tread edge E.

Each part 15 between the axially outer and inner longitudinal main grooves 9A and 9B and a part 16 between the axially inner longitudinal main grooves 9B are crossed by axially extending narrow grooves 17.

As the axially outer surface of the tire shoulder is circumferentially continuous, the above-mentioned curved surface Ba having gradually diminishing curvature is waved and the amplitude thereof is gradually decreased radially inwards from the tread edges E.

The curved surface Ba extends over at least 50%, preferably more than 80% (in this embodiment 100%) of the circumference of the tire. The curved surface Ba is provided on each side of the tire, but it may be possible to provide on one side of the tire.

The intersecting line J between the curved surface Ba and a cylindrical surface centered on the tire axis comprises a waved line L made up of alternating convex curves Ca and concave curves Cb. The amplitude A of the waved line L is preferably set in a range of from 1 to 3 mm, preferably 2 to 3 mm in the tread face. Here, the amplitude A is defined as the peak-to-peak amplitude of the intersecting line J measured on the cylindrical surface K in the axial direction between the peak X1 of the convex curve Ca and the peak X2 of the concave curve Cb.

If the amplitude A is less than 1 mm, it is difficult to optimize the rigidity in the vicinity of the tread edge E in order to improve the wandering performance. If the amplitude A is more than 3 mm, in the vicinity of the tread edge E, the rigidity variation in the circumferential direction excessively increases and uneven wear is liable to occur.

Figure 3:
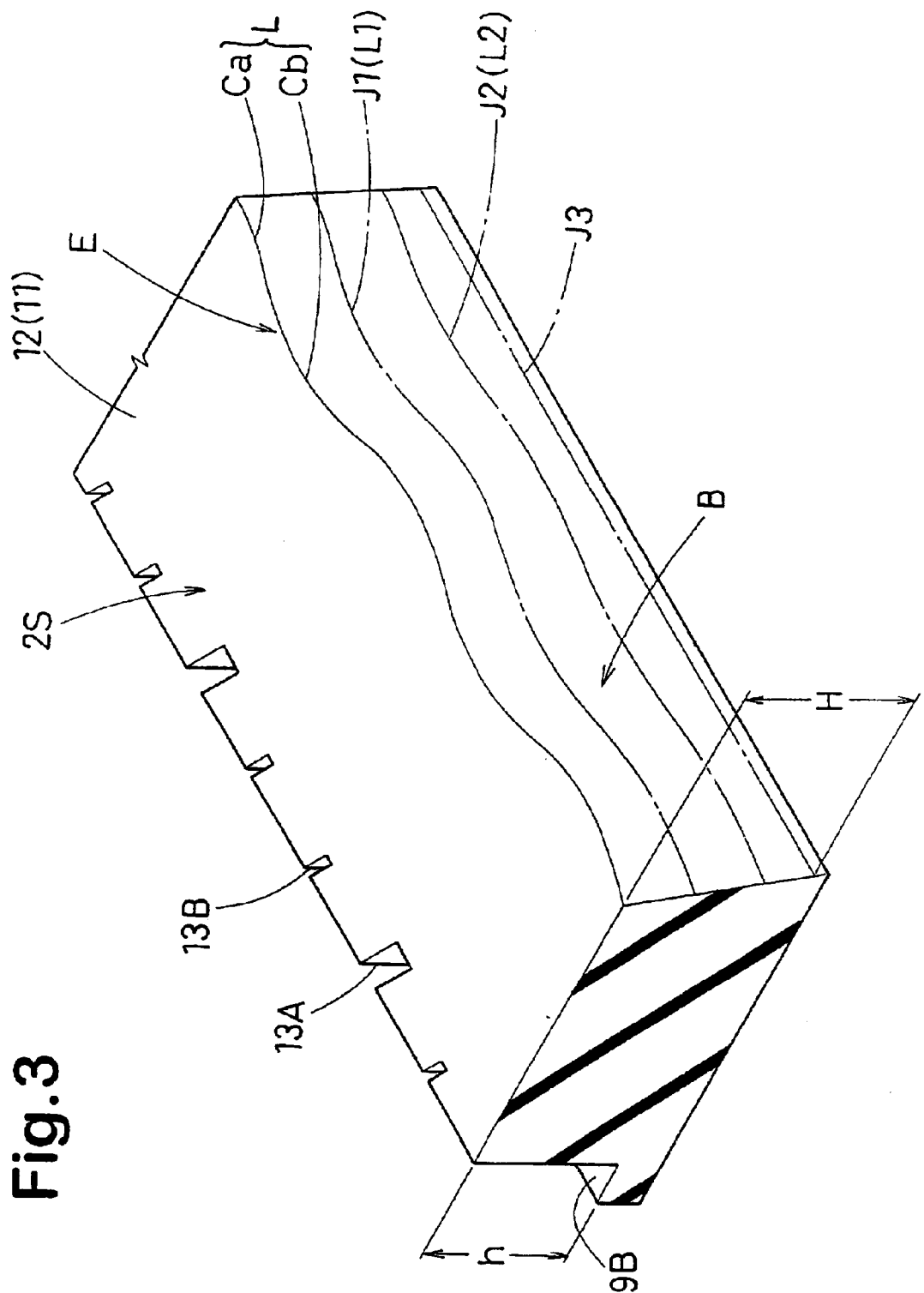
FIG. 3 is a perspective view showing a shoulder rib thereof.

As shown in FIG. 3, the amplitude decreases continuously from the radially outer end of the curved surface Ba i.e. the tread edge to the radially inner end thereof where the amplitude of the intersecting line J (J3) is zero.

The concave and convex curves may be formed by a multi-radius curvature. But, in this example, they are formed by a substantially single radius curvature.

The radius R1 of curvature of the convex curve Ca and the radius R2 of curvature of the concave curve Cb are the substantially same, but it is also possible to use different radii.

As to one pitch of a convex curve Ca and a concave curve Cb, the chord length of the convex curve Ca and the chord length of the concave curve Cb are preferably 50% and 50%. However, it is also possible that the chord lengths are different percentages. In the tread face, the radii R1 and R2 are set in a range of from 8 to 40%, preferably 10 to 30% of the ground contacting width TW.

The radial height H of the curved surface Ba is set in a range of from 1.0 to 2.0 times, preferably 1.3 to 1.7 times the radial height (h) of the rib 12 or the depth of the axially outer longitudinal main groove 9B. In other words, the amplitude becomes zero at a radial distance H from the tread face. If the ratio (H/h) is less than 1.0, it becomes difficult to improve the wandering performance. Even if the ratio (H/h) is increased over 2.0, the wandering performance is not improved any more.

Figure 4:
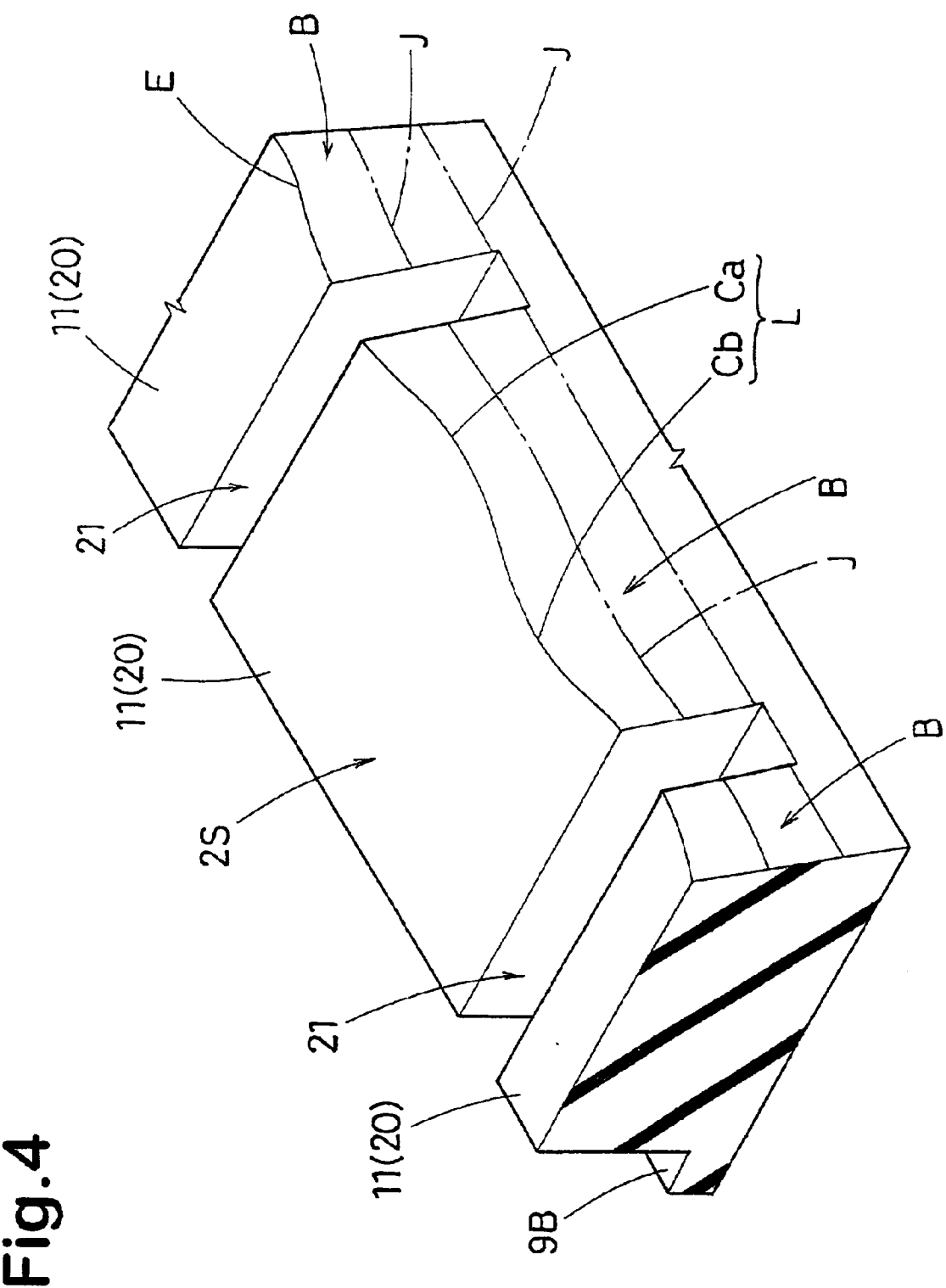
FIG. 4 is a perspective view of shoulder blocks showing another embodiment of the present invention.

FIG. 4 shows a modification of the above-described embodiment wherein the above-mentioned shoulder rib 12 is circumferentially divided by axial grooves 21, namely, the circumferential part 11 between the axially outer longitudinal main groove 9A and the tread edge E is formed as a circumferential row of shoulder blocks 20.

In this case, the arrangement of the axial grooves 21 are synchronized with the cycles of the wave of the curved surface. In the example shown in FIG. 4, the axial grooves 21 are disposed every one and half (1.5) cycle. It is also possible that the axial grooves 21 are disposed every integral number cycles. In any case, it is preferable that one complete convex curve is included therein and each axial groove 21 is positioned at the peak of the convex or concave curve.

Figure 5:
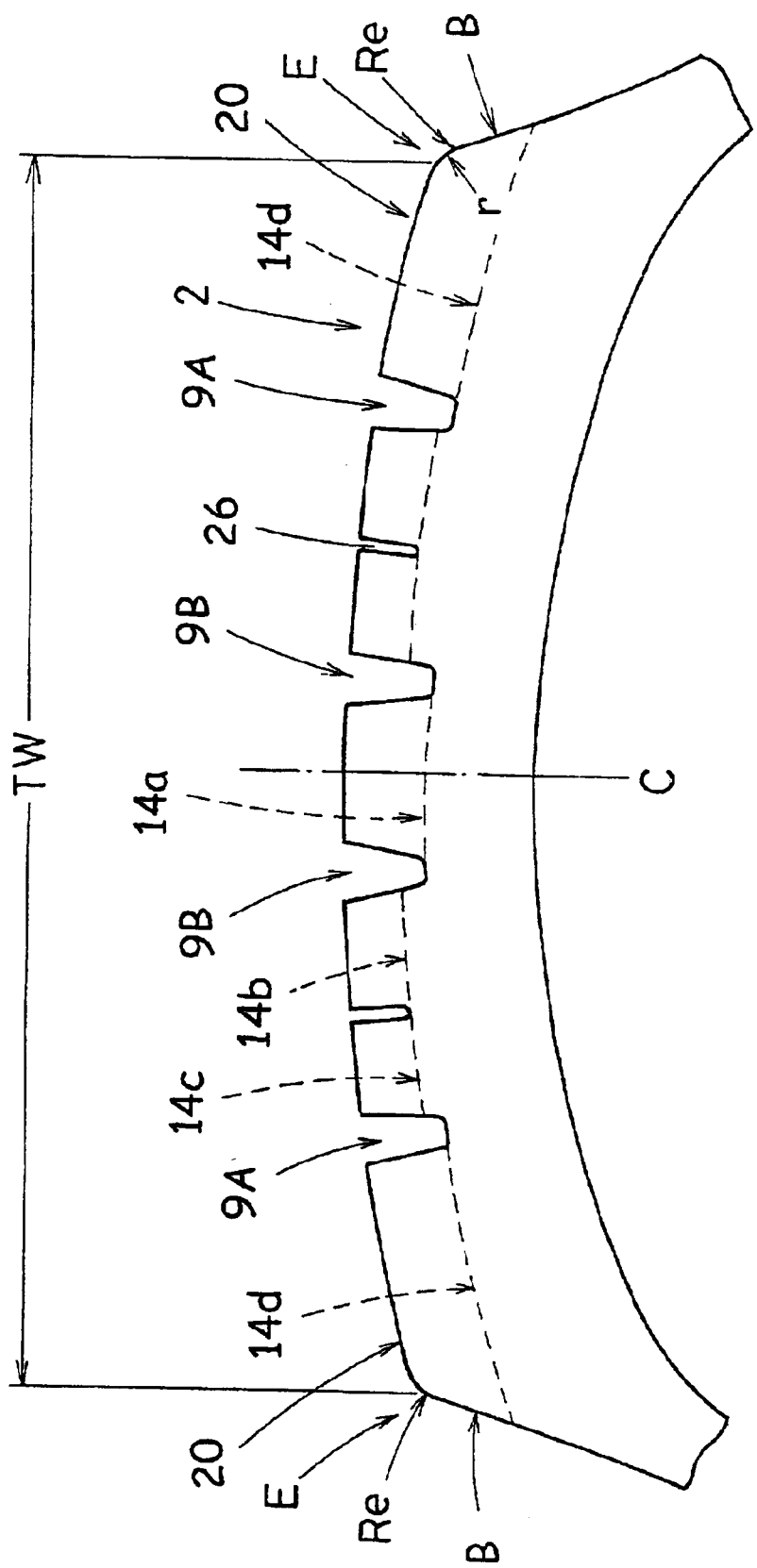
FIG. 5 is a cross sectional view of a tread portion of a pneumatic tire according to the present invention.
Figure 6:
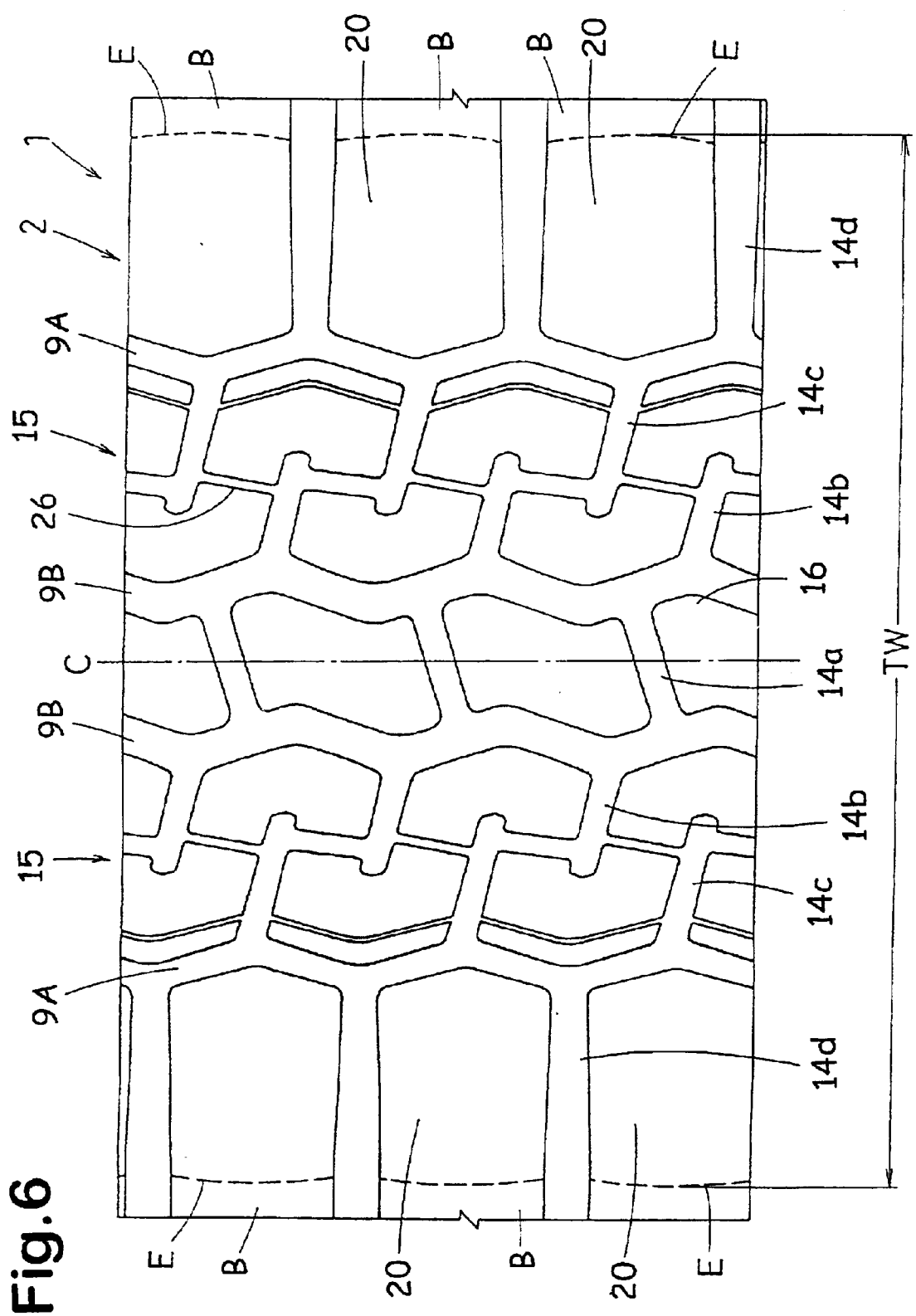
FIG. 6 is a partial developed plan view thereof.
Figure 7:
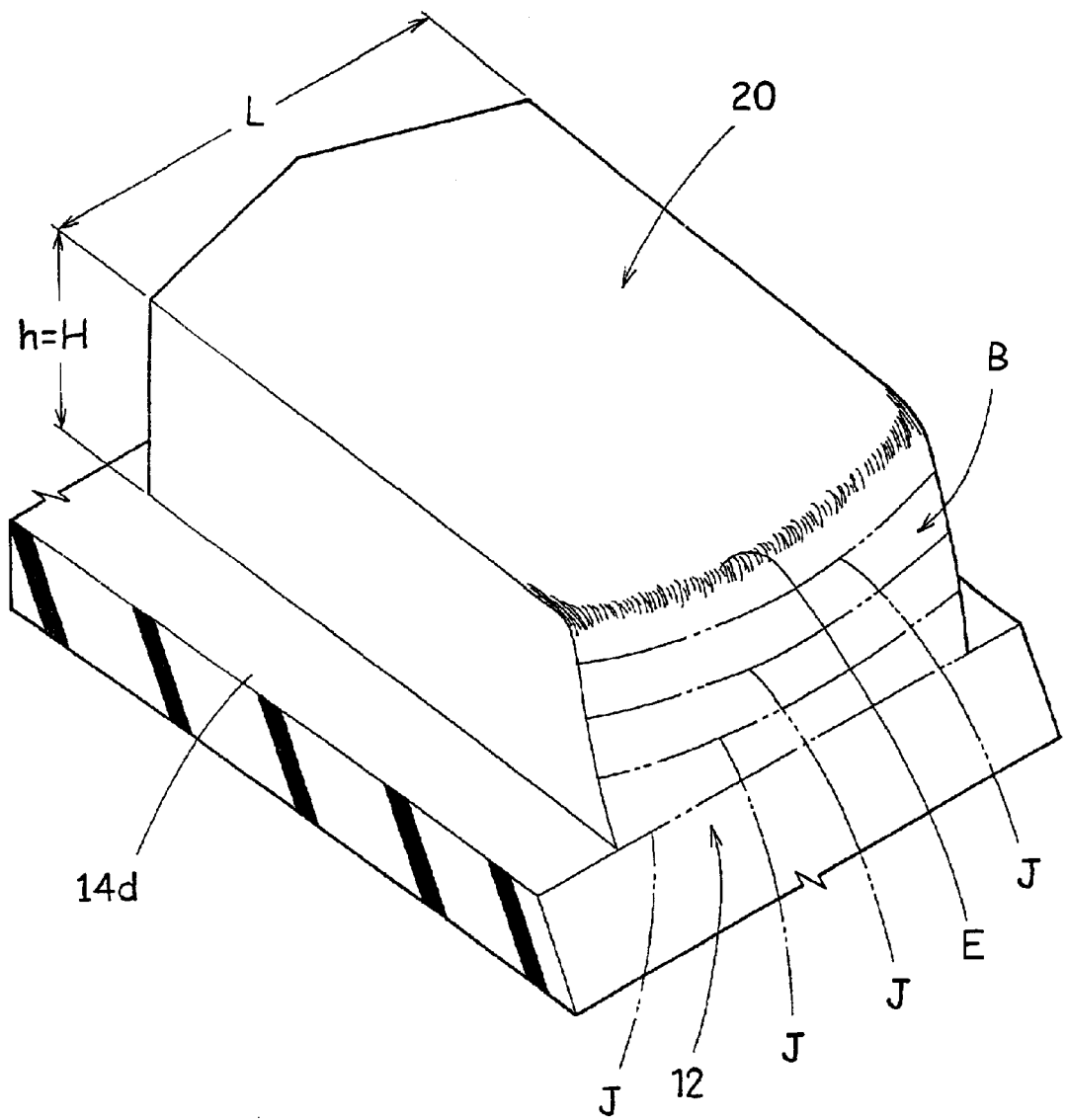
FIG. 7 is an enlarged perspective view of one of the shoulder blocks thereof.
Figure 8:
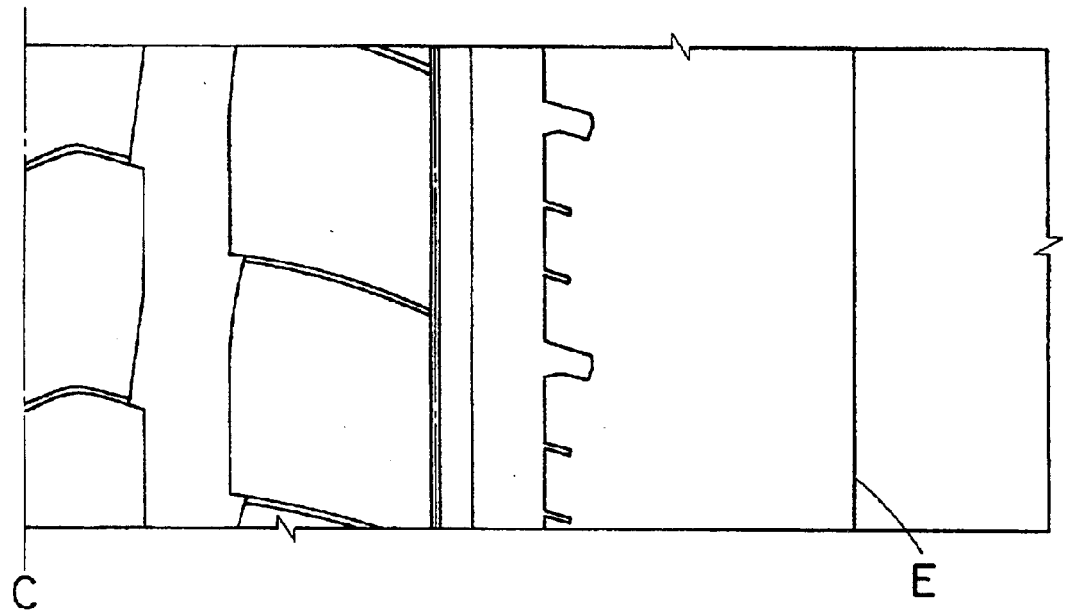
FIGS. 8 and 9 are partial developed plan views of reference tires which were used to compare with the tire shown in FIG. 2.

FIGS. 5, 6 and 7 show another embodiment, wherein a circumferential row of shoulder blocks 20 is formed along each of the tread edges E, and the axially outer surface of each shoulder block 20 is provided with a curved surface Ba having a gradually diminishing curvature.

In this embodiment, the tread portion 2 is provided with longitudinal zigzag main grooves 9 including an axially inner groove 9B disposed on each side of the tire equator C and an axially outer groove 9A disposed axial outside thereof, each extending continuously in the tire circumferential direction.

Further, the tread portion 2 is provided with axial grooves 14a, 14b, 14c and 14d. The first axial grooves 14a extend between the axially inner longitudinal main grooves 9B. The second axial grooves 14b extend axially outwardly from each of the axially inner longitudinal main grooves 9B and terminate before the axially outer longitudinal main grooves 9A. The third axial grooves 14c extend axially inwardly from each of the axially outer longitudinal main groove 9A and terminate before the axially inner longitudinal main grooves 9B. The fourth axial grooves 14d extend axially outwardly from each of the axially outer longitudinal main grooves 9A to the tread edge E. The second and third axial grooves 14b and 14c are connected to each other by a circumferential narrow groove 26.

The axial groove 14 has a groove width of not less than 1.5% of the ground contacting width TW and a groove depth of from 2 to 12% of the ground contacting width TW.

The longitudinal main grooves 9 have a groove width of not less than 2.0%, preferably not less than 2.5% of the ground contacting width TW and a groove depth of from 5 to 12% of the ground contacting width TW. In case of heavy duty tire, the groove width of the longitudinal main groove 3 is at least 5 mm.

This tread pattern is suitable for a heavy duty radial tire of all-season type.

In this embodiment, as the curved surface Ba is broken in the circumferential direction by the axial grooves 14, as shown in FIG. 7, the curved surface Ba on each shoulder block 20 is made up of a concave curve, namely, the intersecting line J between the curved surface Ba and a cylindrical surface centered on the tire axis consists of a convex curve.

The convex curve may be formed by a multi-radius curvature, but in this example, it is formed by a substantially single radius curvature. The radius R1 of curvature thereof gradually (in this example continuously) increases from the radially outer end in the tread face to the radially inner end where the intersecting line J becomes straight. In the tread face, the radius R1 of the convex curvature is set in a range of from 1.5 to 4.5 times, preferably 2.0 to 4.0 times the circumferential length L of the shoulder block 20.

The shoulder block 20 is not provided in the vicinity of the axially outer edge or the tread edge E with all kinds of sipes and grooves.

In this embodiment, the radial height H of the curved surface Ba is set in a range of not less than 60%, preferably more than 80%, more preferably 100% of the radial height (h) of the shoulder block 20. In other words, the curvature becomes zero at a radial distance H from the tread face.

On the immediately radially inside of the radially inner end of the curved surface Ba, the intersecting line between the outer surface of the tire and a cylindrical surface centered on the tire axis is substantially straight.

Preferably, all of the shoulder blocks 20 are provided with the curved surface Ba. At least 70% in number of the shoulder blocks 20 should be provided with the curved surface Ba.

As to the tire shoulder of each of the above-mentioned embodiments, it may be formed as an angled square shoulder as shown in FIG. 1 or a round shoulder as shown in FIG. 5, namely, the examples shown in FIGS. 3 and 4 may be rounded and the example shown in FIG. 7 may be angled.

In case of round shoulder, the rounding radius (r) is set in a range of 2 to 10 mm, preferably 4 to 8 mm in a tire meridian section. Thus, due to the curved surface Ba, the rounding radius (r) can be greatly decreased. In case of the FIG. 7 example in particular, it is preferable that the ratio (R1/r) between the rounding radius (r) and the above-mentioned radius R1 in the tread face is set in a range of 4 to 40, more preferably 8 to 25, and the rounding radius (r) is set in a range of 2 to 6%, more preferably 3 to 5% of the ground contacting width TW.

If the ratio (R1/r) is less than 4, the wear resistance near the tread edge is liable to decrease. If the ratio (R1/r) is more than 40, it becomes difficult to improve the wandering performance.

Comparison Test

Heavy duty radial tire of size 11R22.5 14P (wheel rim size: 22.5×7.50) having the internal structure shown in FIG. 1 were made and tested for wandering performance, resistance to uneven wear, and resistance to rubber tear-off.

The specifications of the test tires and test results are shown in Table 1 and Table 2.

TABLE 1

Figure 9:
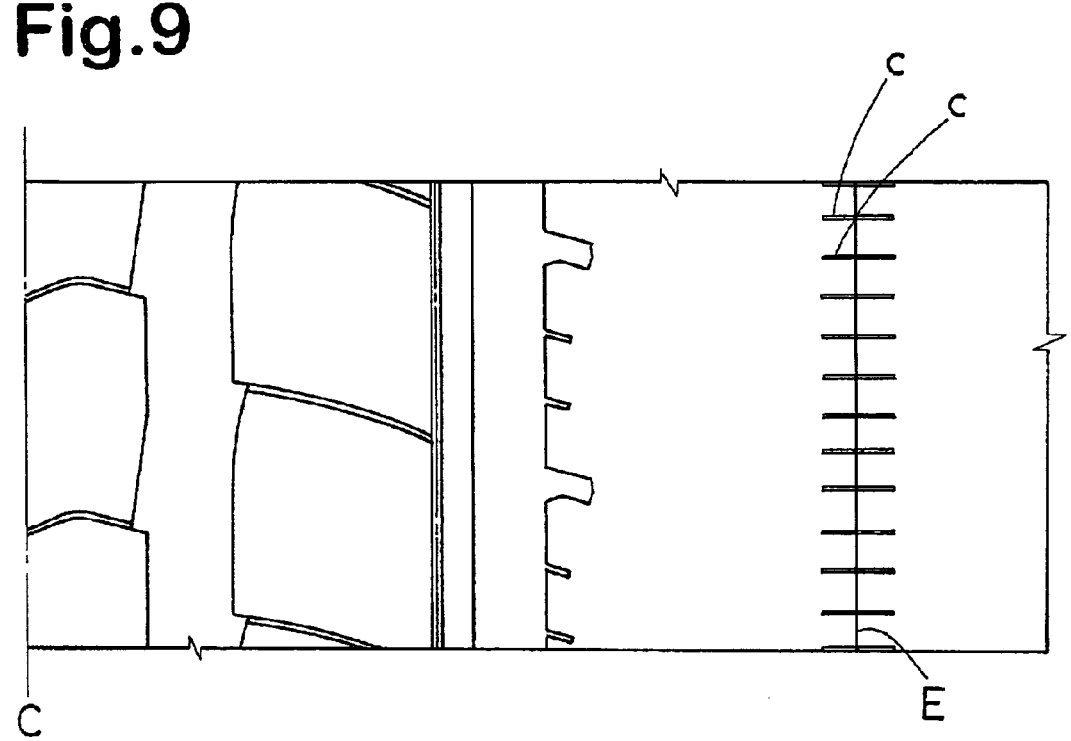

| Tire | Ex. 1A | Ex. 2A | Ex. 3A | Ex. 4A | Ref. 1A | Ref. 2A |
|---|---|---|---|---|---|---|
| Tread pattern | FIG. 2 | FIG. 2 | FIG. 2 | FIG. 2 | FIG. 9 | FIG. 10 |
| Curved surface *1 @ Tread edge | FIG. 3 | FIG. 3 | FIG. 3 | FIG. 3 | none | none |
| Amplitude A (mm) | 1 | 2 | 3 | 4 | 0 | 0 |
| Convex curve R1 (mm) | 54 | 28 | 19 | 15 | — | — |
| Concave curve R2 (mm) | 54 | 28 | 19 | 15 | — | — |
| R1/TW = R2/TW = | 0.26 | 0.13 | 0.09 | 0.07 | — | — |
| Sipe | none | none | none | none | none | 10 mm *2 |
| Test Results | | | | | | |
| Wandering | 6 | 7 | 7.5 | 7.5 | 5 | 6 |
| Uneven wear | none | none | minimal | little | none | pretty |
| Tear-off | none | none | none | none | none | many |

*1 The radial height of the curved surface was 160% of the height of the rib from the tread edge.
*2 The tread edges were provided with axial sipes of 10 mm long.

Table 1 shows the test results concerning the rib type example shown in FIG. 2.

Wandering performance test: A 20-ton truck of 2-D4 wheel type provided on all the wheels with test tires was run on a rutted road in a tire test course, and the wandering performance was evaluated into ten ranks by the test driver based on the reaction on the steering wheel when the tire runs into and out a rut. (Tire inflation pressure=700 kPa, Loadage=10 tons.)

Uneven wear resistance and rubber tear-off resistance test: The trucks provided on the front wheels with test tires were run for 60,000 km, and thereafter the tires was subjected to a visual examination.

TABLE 2

| Tire | Ref. 1B | Ref. 2B | Ex. 1B |
|---|---|---|---|
| Tread pattern | FIG. 6 | FIG. 6 | FIG. 6 |
| Curved surface | none | none | FIG. 7 *1 |
| Radius R1 @ Tread edge (mm) | — | — | 110 |
| Sipe | none | provided | none |
| Tread edge *2 | rounded | rounded | rounded |
| Test Results *3 | | | |
| Wandering performance | B | A | A |
| Uneven wear | A | B | A |
| Tear-off | A | C | A |

*1 Radial height = Axial groove's depth
*2 Radius (r) = 8 mm
*3 A: good, B: average, C: bad Table 2 shows the test results concerning the block type example shown in FIG. 6.

Wandering performance test: Same as above, but the performance was evaluated into three ranks.

Uneven wear and rubber tear-off resistance test: Same as above, but the running distance was 40,000 km.

As described above, in the pneumatic tires according to the present invention, wandering performance can be effect improved without suffering from uneven wear, tread rubber tear-off, decreases ground contacting area and the like.

The resent invention is suitably applied to heavy duty radial tires, but it can be applied to various pneumatic tires for passenger cars, light trucks and the like.

What is claimed is:

1. A pneumatic tire comprising
a tread portion with a pair of tread edges, and
a tire shoulder extending radially inwardly from one of the tread edges, provided with a curved surface, wherein
said tread portion is provided along at least one of the tread edges with a circumferential rib with said curved surface,
the curved surface comprises a plurality of convex curves with a plurality of concave curves alternating therewith,
on a cylindrical surface centered on the tire axis and intersecting said curved surface,
each said convex curve swells axially outwards to have a curvature, and each said concave curve caves axially inwards to have a curvature, and the intersecting line between the curved surface and the cylindrical surface is a waved line, and
each of said curvature of the convex curve and said curvature of the concave curve gradually diminishes towards the radially inside from the tread edge.

2. The pheumatic tire according to claim 1, wherein
said rib extends continuously in the tire circumferential direction, and
the curved surface is provided along at least 50% of the circumferential length of the rib.

3. The pneumatic tire according to claim 1, wherein
the peak-to-peak amplitude of said waved line is in a range of from 1 to 3 mm at the tread edge, and gradually decreases towards the radially inside of the tire.

4. The pneumatic tire according to claim 1, wherein
the radius of the convex curve and the radius of the concave curve are in a range of from 8 to 40% of the ground contacting width at the tread edge.

5. The pneumatic tire according to claim 1, wherein the tread edge is angled.

6. The pneumatic tire according to claim 1, wherein the tread edge is rounded.

7. A pneumatic tire comprising a tread portion with a pair of tread edges, a tire shoulder extending radially inwardly from one of the tread edges, provided with a curved surface comprising a plurality of convex curves and a plurality of concave curves alternating therewith, and on a cylindrical surface centered on the tire axis and intersecting said curved surface, each said convex curve swelling axially outwards to have a curvature, and each said concave curve caving axially inwards to have a curvature, so that the intersecting line between the curved surface and the cylindrical surface is a cyclic waved line, wherein said curvature of the convex curve and said curvature of the concave curve gradually diminish radially inward from the tread edge, said tread portion is provided along at least one of the tread edges with blocks with said curved surface, said blocks are circumferentially divided by axial grooves, and the axial grooves being arranged in one and a half cycle of the wave of said cyclic waved line so that each of the axial grooves is positioned at a peak of one of the convex curves or alternatively one of the concave curves.

* * * * *